US008975837B2

(12) United States Patent
Magini et al.

(10) Patent No.: US 8,975,837 B2
(45) Date of Patent: Mar. 10, 2015

(54) METHOD FOR REDUCING THE STARTING CURRENT OF A MULTI-PHASE MACHINE OPERATED BY BLOCK COMMUTATION

(75) Inventors: Fabio Magini, Hemingen (DE); Paul Mehringer, Stuttgart (DE); Julian Roesner, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 13/577,723

(22) PCT Filed: Feb. 9, 2011

(86) PCT No.: PCT/EP2011/051892
§ 371 (c)(1),
(2), (4) Date: Oct. 25, 2012

(87) PCT Pub. No.: WO2011/098485
PCT Pub. Date: Aug. 18, 2011

(65) Prior Publication Data
US 2013/0038252 A1    Feb. 14, 2013

(30) Foreign Application Priority Data
Feb. 10, 2010    (DE) .......................... 10 2010 001 774

(51) Int. Cl.
H02P 1/24    (2006.01)
H02P 1/26    (2006.01)
H02P 1/46    (2006.01)
H02P 6/08    (2006.01)
H02P 27/06   (2006.01)
H02P 27/12   (2006.01)

(52) U.S. Cl.
CPC .. H02P 1/26 (2013.01); H02P 1/46 (2013.01); H02P 6/085 (2013.01); H02P 27/06 (2013.01); H02P 27/12 (2013.01)

USPC ................. 318/139; 318/400.17; 318/400.01; 318/700

(58) Field of Classification Search
CPC ........................................................ H02P 1/26
USPC ........................ 318/139, 400.17, 400.01, 700
See application file for complete search history.

(56) References Cited

U.S. PATENT DOCUMENTS 4,998,053  A  *  3/1991   Hamann et al. ............... 318/723
5,581,169  A  *  12/1996  Kerkman et al. ............. 318/811
6,577,097  B2     6/2003   Krefta et al.
(Continued)

FOREIGN PATENT DOCUMENTS

CN          1921282        2/2007
CN          101188399      5/2008
(Continued)

OTHER PUBLICATIONS

International Search Report for PCT/EP2011/051892, dated Apr. 4, 2012.

*Primary Examiner* — David S Luo
(74) *Attorney, Agent, or Firm* — Kenyon & Kenyon LLP

(57) ABSTRACT

In a method for reducing the starting current of a multi-phase machine operated by block commutation, which includes a battery, one high side switch for each phase, a low side switch and a phase winding as well as a rotor, the high side switch assigned to one current phase or the low side switch assigned to one current phase is held in the closed state, and the low side switches or the high side switches assigned to the other current phases are alternately controlled.

11 Claims, 3 Drawing Sheets

(56) References Cited

U.S. PATENT DOCUMENTS

| | | |
|---|---|---|
| 7,504,790 B2 | 3/2009 | Tsuji et al. |
| 2003/0062860 A1 | 4/2003 | Wu et al. |
| 2008/0116840 A1 | 5/2008 | Welchko et al. |
| 2009/0174350 A1 | 7/2009 | Kuroda et al. |

FOREIGN PATENT DOCUMENTS

| | | |
|---|---|---|
| CN | 101483403 | 7/2009 |
| DE | 101 56 939 | 6/2003 |
| DE | 10 207 338 | 9/2003 |
| WO | WO 2008 012 212 | 1/2008 |

* cited by examiner

METHOD FOR REDUCING THE STARTING CURRENT OF A MULTI-PHASE MACHINE OPERATED BY BLOCK COMMUTATION

BACKGROUND OF THE INVENTION

1. Field of the Invention

The present invention relates to a method for reducing the starting current of a multi-phase machine operated by block commutation.

2. Description of the Related Art

The use of a belt-driven starter generator for starting a motor vehicle is known. This belt-driven starter generator has an inverter situated between the battery of the motor vehicle and the machine. The inverter is an item of power electronics which includes a high side switch and a low side switch. The machine is operable in motor-driven mode and in generator mode.

When starting in motor-driven mode, the start-up of the internal combustion engine of the motor vehicle takes place while the vehicle is idle.

So-called block commutation is a simple and known method for controlling the switches of the power electronics. One advantage of this control method is that it requires no, or at best small, DC-link capacitors. DC-link capacitors of this type may usually be installed in a motor vehicle only with difficulty. A disadvantage of this control method is that high starting currents occur which have a disadvantageous effect on the design of the electronics and the packaging.

The use of PWM at low rotational speeds and block commutation at high rotational speeds is already known from U.S. Pat. No. 7,504,790 B2. This opens up the possibility of limiting the starting current with the aid of high-frequency pulsing. However, the disadvantage of this approach is that a DC-link capacitor having a comparatively high capacitance is needed.

A method for switching between a 120° control and a 180° control is already known from U.S. Pat. No. 6,577,097 B2. Although the need for a high-capacitance DC-link capacitor is eliminated, the problem remains that the starting current is very high in an idle or slowly rotating internal combustion engine, i.e., at a crankshaft speed in the range between 0 revolutions per minute and approximately 400 revolutions per minute. As a result, the load on the output stages is also high. To avoid destroying the output stages due to the high load, the output stages must be adjusted to this high load with the aid of suitable dimensioning. However, this causes the output stages to be overdimensioned for all additional operating points. Another disadvantage is that undesirable voltage drops may occur in the power supply to the vehicle electrical system, due to the high currents flowing during the startup phase. In block-commutated systems, there is no way to reduce the high currents mentioned above with the aid of high-frequency pulsing, for example at 16 KHz, since no DC-link capacitor having a sufficient capacitance is available for this purpose.

BRIEF SUMMARY OF THE INVENTION

A method according to the present invention has the advantage over the related art that the starting current of a multiphase machine operated by block commutation is reduced. This enables the output stages to be more favorably dimensioned, since the starting current is the relevant design criterion. At higher rotational speeds, the phase currents are automatically limited on the basis of the counter-induced voltage. Furthermore, the vehicle electrical system and the mechanical belt drive—if the machine is a belt-driven starter generator—are subjected to lighter loads at startup. In the event that the electric machine is blocked, immediate destruction of the output stage is also not to be expected.

DETAILED DESCRIPTION OF THE INVENTION

Figure 1:
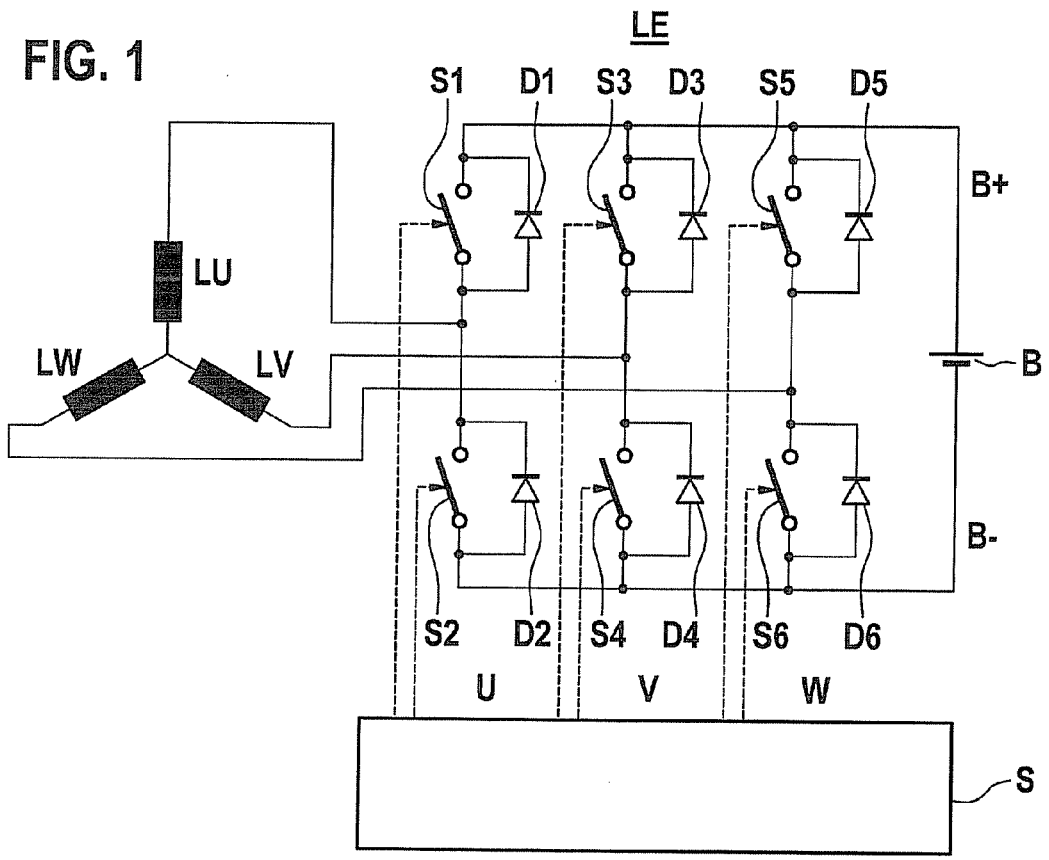
FIG. 1 shows a block diagram for exemplifying the configuration of a 3-phase, block-commutated, belt-driven starter generator.

FIG. 1 shows a block diagram of the configuration of a multi-phase machine, the machine being a 3-phase, block-commutated, belt-driven starter generator. The starter generator includes a battery B, which has a positive pole B+ and a negative pole B−. Battery B is connected to power electronics LE. The power electronics includes three branches U, V, W, each of which has a series connection of two switches, a diode being antiparallel-connected to each of these switches. This configuration is the result of the use of conventional field effect transistors, since they include an inverse diode. In principle, however, the use of other switching elements, such as IGBTs, is also conceivable.

Branch U of power electronics LE is connected to a phase winding LU of the stator of the starter generator at a connecting point between the two switches S1 and S2. Switch S1 of branch U is a high side switch. A diode D1 is connected antiparallel to switch S1. Switch S2 of branch U is a low side switch. A diode D2 is connected antiparallel to switch S2. Switches S1 and S2 are controlled by a control unit S.

Branch V of power electronics LE is connected to a phase winding LV of the stator of the starter generator at a connecting point between switches S3 and S4. Switch S3 of branch V is a high side switch. A diode D3 is connected antiparallel to switch S3. Switch S4 of branch V is a low side switch. A diode D4 is connected antiparallel to switch S4. Switches S3 and S4 are also controlled by control unit S.

Branch W of power electronics LE is connected to a phase winding LW of the stator of the starter generator at a connecting point between switches S5 and S6. Switch S5 of branch W is a high side switch. A diode D5 is connected antiparallel to switch S5. Switch S6 of branch W is a low side switch. A diode D6 is connected antiparallel to switch S6. Switches S5 and S6 are also controlled by control unit S.

Phase windings LU, LV and LW of the stator form a star connection in the illustrated exemplary embodiment. However, they can also be interconnected in the manner of a delta connection. If switches S1 through S6 are each implemented in the form of a MOSFET switch, they include diodes D1 through D6, which have already been illustrated separately.

In starter mode, power taken from battery B is fed into the system and converted into mechanical energy. In rectifier mode, the energy flows from the phase windings of the stator to the battery via the power electronics acting as the rectifier and on to the consumers of the vehicle electrical system, which are not illustrated in FIG. 1.

In starter mode, a torque of the rotor must be built up by suitably controlling the stator windings. A maximum torque may be achieved if the stator field and the rotor field are positioned at an offset angle of 90 degrees from each other.

Figure 2:
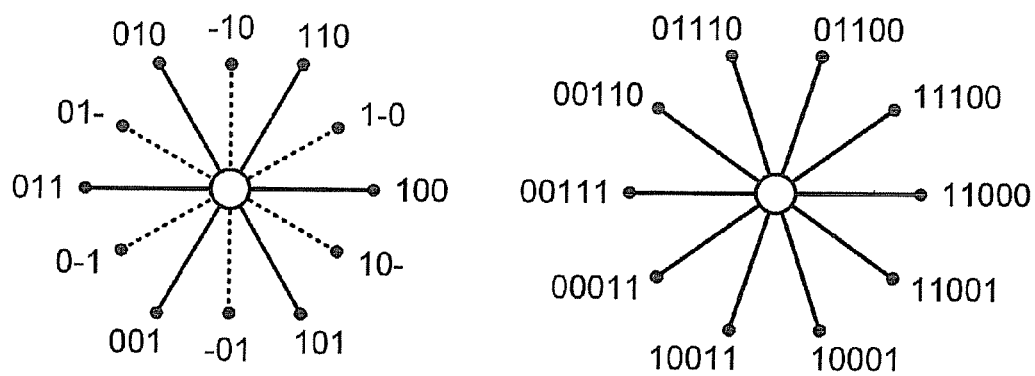
FIG. 2 shows a sketch for exemplifying the setting of the magnetic field vector in the stator with the aid of the control scheme used in 3-phase and 5-phase systems.

FIG. 2 shows sketches for illustrating examples of a setting of the magnetic field vector in the stator of a three-phase machine and a five-phase machine. In each case, numeral "1" stands for a closed switch in the direction of positive pole B+ of battery B, i.e., for a closed high side switch. In each case, numeral "0" stands for a closed switch in the direction of negative pole B− of battery B, i.e., for a closed low side switch. A dash "-" stands for a phase in which the two switches, i.e., both the high side switch and the low side switch, are in the open state.

A 120° block commutation is understood to be a control method in which only two of six switches, in the case of a 3-phase machine, are closed at the same time. A 180° block commutation is understood to be a control method in which three of six switches, in the case of a 3-phase machine, are closed at the same time.

In the left-hand representation in FIG. 2, the magnetic vectors for a 3-phase machine are illustrated in the case of a 120° block commutation (dashed lines) and a 180° block commutation (solid lines). The magnetic vectors for the 180° block commutation have an offset angle of 60° in relation to each other. The magnetic vectors for the 120° block commutation also have an offset angle of 60° in relation to each other, and they each have an offset angle of 30° in relation to the magnetic vectors of the 180° block commutation. The magnetic vectors of the 120° block commutation are shorter than the magnetic vectors of the 180° block commutation, since a higher current occurs in a 180° block commutation, due to the parallel connection of two high side or two low side switches. All positions, which are located between the illustrated magnetic vectors, are not representable via a block commutation but instead must be approached by a different type of modulation, for example a sine-wave modulation. In block-commutated systems, a torque ripple always occurs at the rotor due to these abrupt changes.

In the starting phase, the instantaneous position or angle position of the rotor relative to the stator is usually measured with the aid of an angle measuring device. As a function of the measurement result, a stator magnetic field is set in such a way that the associated stator magnetic field vector approaches the desired 90° offset as closely as possible with regard to the rotor magnetic field or the rotor magnetic field vector.

The magnetic vectors for a 5-phase machine are shown in the right-hand representation in FIG. 2. For the sake of simplicity, only the equivalent of a 180° control operation for 3-phase machines is illustrated, i.e., of 10 available switches, only 5 switches are in operation at any point in time. The individual magnetic field vectors each have an offset of 36° in relation to each other.

Figure 3:
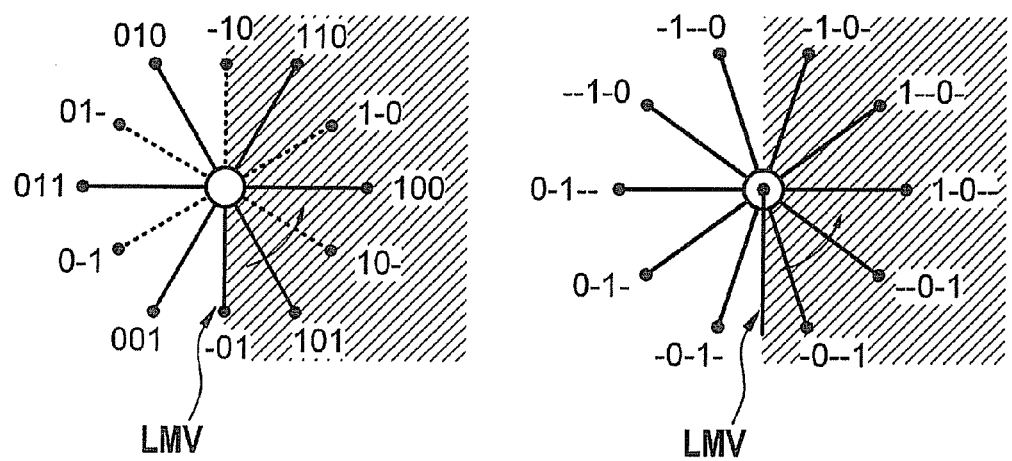
FIG. 3 shows representations for exemplifying the possible magnetic field vector when setting a preferred direction of rotation.

FIG. 3 shows representations for exemplifying a possible magnetic field vector when setting a preferred direction of rotation.

The situation for a 3-phase machine is shown by way of example in the left-hand representation in FIG. 3. In this example, rotor magnetic field vector LMV points vertically downward. For all other positions having a 60° offset of the LMV, the necessary control pattern for the power electronics of the stator may be obtained from simple symmetry observations. Consequently, control pattern "100" would be set for a 180° block commutation, while a decision would have to be made between control patterns "10 -" or "1 - 0" for a 120° block commutation. Both of the latter control patterns would initially generate the same torque at the machine. The hatched area in FIG. 3 is the permitted area for the rotor magnetic field vector, which results in an acceleration of the rotor in the counter-clockwise direction, albeit at a torque of a different magnitude. Studies have shown that the rotational speed increases very little within the first few milliseconds, typically within 20 milliseconds, while high currents occur. This results in enormous temperature increases in the output stages of the power electronics, these increases no longer occurring during further operation of the machine. Enormous temperature increases of this type may be avoided if the stator magnetic field vector is varied within the hatched area in FIG. 3 while the machine is stopped. Ideally, the stator magnetic field vector should oscillate around the desired 90° angle in relation to the rotor magnetic field vector. The hatched area in FIG. 3 is characterized by the fact that the numeral "1" is always positioned in first place. The associated high side branch is therefore subjected to the highest load. In the method according to the present invention, a relief of the load on the corresponding current path is therefore induced by an intelligent control of the low side branches. The control sequence is thus as follows: 1 - 0, 1 - -, 10 -, 1 - -. This sequence is repeated, the time durations of the individual states being variable depending on the current demand.

In the right-hand representation in FIG. 3, the situation for a 5-phase machine is shown by way of example, rotor magnetic field vector LMV pointing vertically downward in this example as well. For the sake of simplicity, only the equivalent of a 120° control operation for 3-phase machines is plotted, i.e., only 2 of the 10 available switches are actively controlled at any point in time. It is apparent that 5-phase machines or general, higher-phase machines have an advantage over 3-phase machines, since the stator magnetic field vector may be set with a finer resolution. In the event of a deviation from the desired ideal angle of 90°, the torque loss is thus less than in 3-phase machines.

Studies have shown that different effects on the temperatures to be expected at the output stages occur in the known block commutation. Lower output stage currents occur in the case of a 120° block commutation than in the case of a 180° block commutation. It has furthermore been shown that the currents flowing in the output stages are further reduced in the event of a pulsed block commutation. This reduces the averaged battery current as well as the built-up torque. Due to the extinction voltages of the lead inductance, however, the temperature load on the output stages is only insignificantly reduced. According to the related art, such a reduction of the temperature load on the output stages is induced by the use of a high-capacitance DC-link capacitor.

In the method according to the present invention, the use of a high-capacitance DC-link capacitor is not necessary. In the method according to the present invention, a reduction of the temperature load on the output stages is induced by the fact that, during the starting phase, either the high side switch assigned to one current phase is held in the closed state and the low side switches assigned to the other current phases are alternately controlled, or a low side switch is held in the closed state and the two high side switches of the other phases are alternately controlled. In the exemplary embodiment according to the left-hand representation in FIG. 3, a switching back and forth between switching states "10 -" and "1 - 0"

is carried out, preferably using a variable duration of the individual control operations and/or a variable pause between consecutive control operations. Technically speaking, the control sequence includes the switching states "10 -," "1 - -," "1 - 0" "1 - -." An asymmetrical activation ratio between the low side switches may be selected. Furthermore, this alternating control may preferably be carried out using a switching period which is shorter than the time constant of the stator winding.

This alternating control of the low side switches corresponds to an oscillation of the stator magnetic field around the ideal angle position of 90°.

This procedure provides the opportunity to control the averaged battery current in a desirable manner without significantly increasing the temperature load on the output stages. The upper switching branch, i.e., the associated high side switch, is being held in the closed state.

When the rotational speed of the rotor exceeds a predefined rotational speed threshold value, the system switches to a normal control pattern in the sense of a 120° block commutation or a 180° block commutation, i.e., a block-commutated control of the power electronic switches is carried out.

One advantage of the procedure according to the present invention is that, while a continuous load is placed on the upper switching branch, the extinction voltages are alternately applied in the two low side switches. A compensation of the occurring power losses, and thus a temperature compensation, occurs between the three participating switches. The current level may be controlled by varying the pauses between the switching states of the low side switches. During the control pauses, a free-wheeling of the phase current in the inverse diodes of the opposite path occurs. This free-wheeling may be prolonged by actively controlling the corresponding switching path, which reduces the power loss in the switching element.

Figure 4:
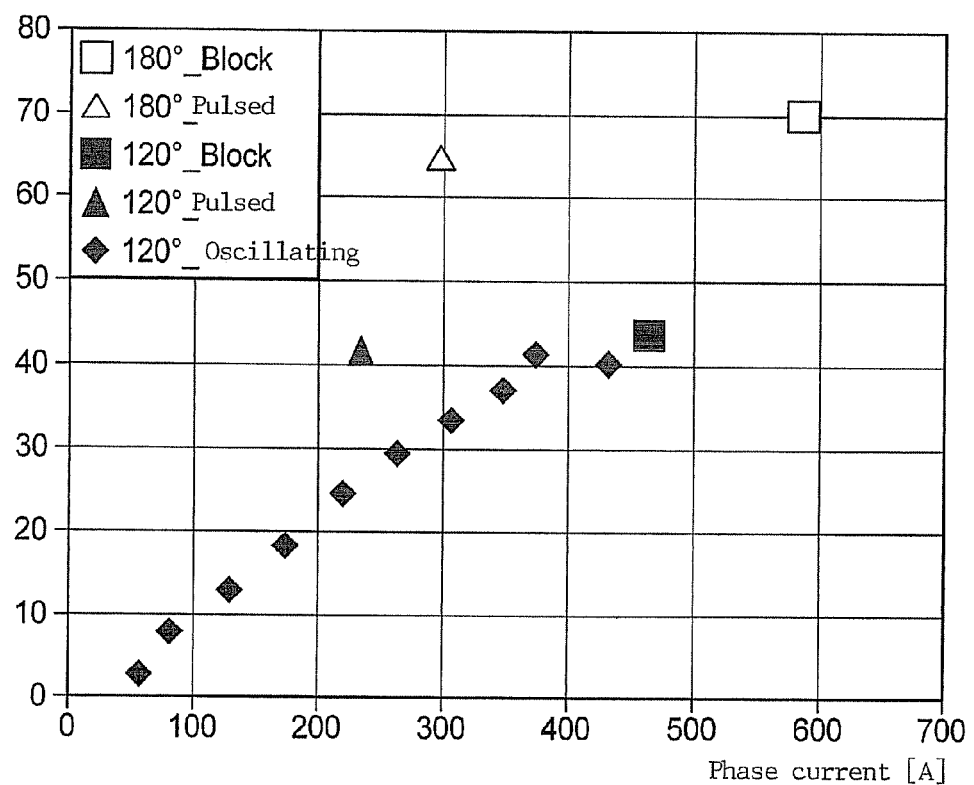
FIG. 4 shows a diagram for exemplifying the connection between the averaged phase current and the simulated temperature increase at the output stages using a simulation duration of 20 ms.

FIG. 4 shows a diagram for exemplifying the connection between the averaged phase current and the simulated temperature increase at the output stages, using a simulation duration of 20 ms. The averaged phase current is a measure for the achievable torque. The sum of the two phase currents, which lie in the torque-generating direction, were observed for the phase currents. In the present exemplary embodiment, these are W-U and W-V. As is apparent from FIG. 4, the temperature load due to the extinction voltages is not reduced during pulsed operation using 120° control or 180° control. Due to the method according to the present invention, the phase currents and the temperature load are reduced proportionately to each other.

Figure 5:
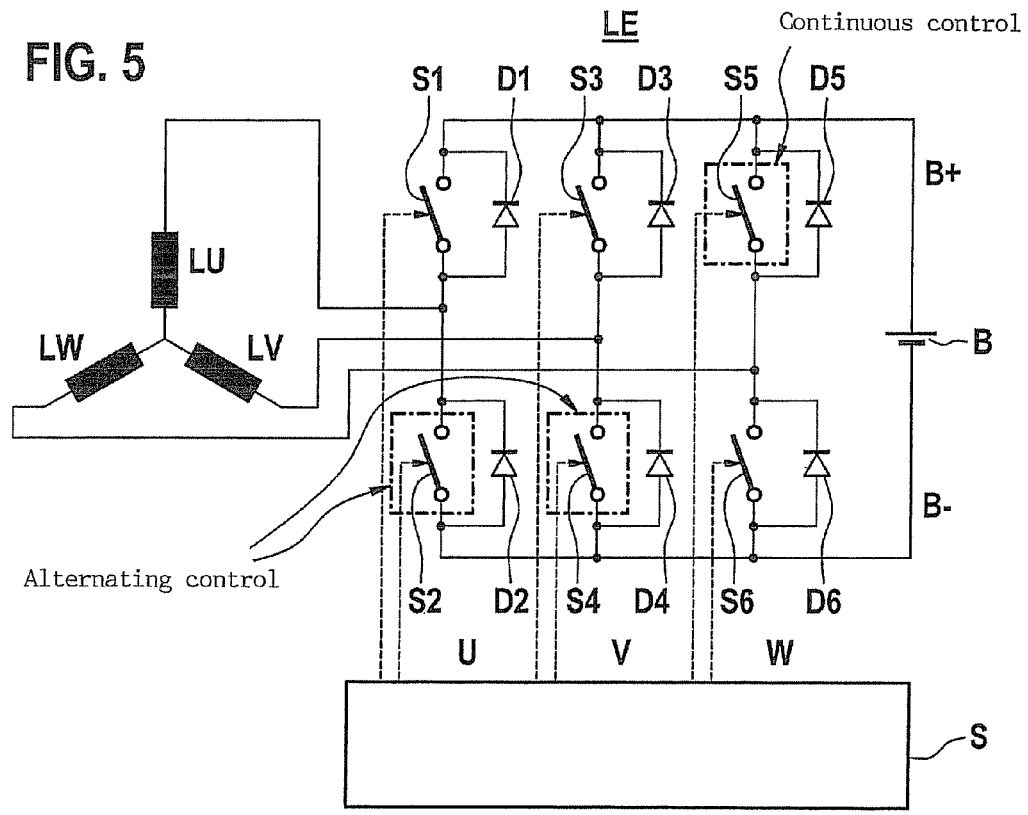
FIG. 5 shows a block diagram for exemplifying an exemplary embodiment for a control method according to the present invention.

FIG. 5 shows a block diagram for exemplifying an exemplary embodiment for a control method according to the present invention. The corresponding control varies, depending on the instantaneous position of the rotor magnetic field vector. In this figure, it is apparent that high side switch S5 situated in branch W is controlled continuously, while low side switch S2 situated in branch U and low side switch S4 situated in branch V are alternately controlled. The configuration of the machine shown in FIG. 5 corresponds to the configuration of the machine shown in FIG. 1.

Figure 6:
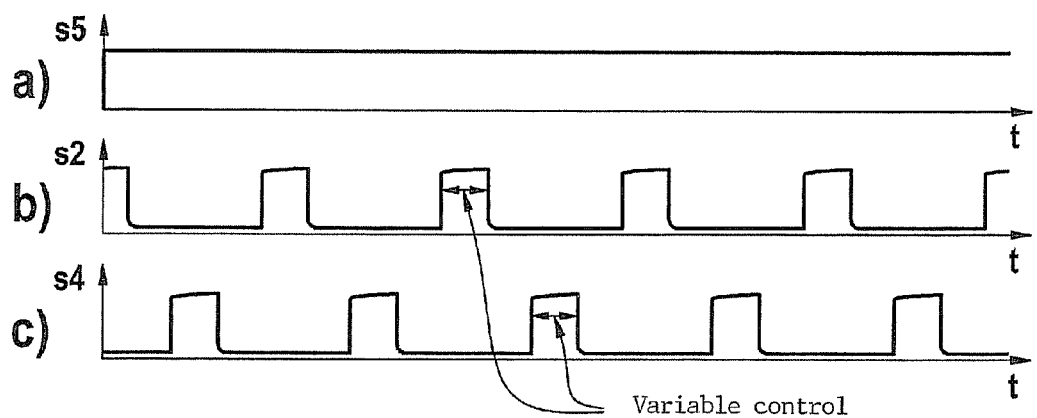
FIG. 6 shows a diagram for exemplifying a control pattern which may be used in conjunction with the present invention.

FIG. 6 shows a diagram for exemplifying a control pattern which may be used in conjunction with the present invention. FIG. 6a exemplifies the continuous control of high side switch S5 situated in branch W with the aid of a control signal s5. FIG. 6b exemplifies the control of low side switch S2 situated in branch U with the aid of a control signal s2. FIG. 6c exemplifies the control of low side switch S4 situated in branch V with the aid of a control signal s4. It is apparent that switches S2 and S4 are controlled alternately. It is further-more apparent from FIGS. 6b and 6c that the control duration of switches S2 and S4 may be varied.

If other starting positions exist which deviate from the angle described above, the 120° control patterns located on both sides of the 90° angle must be determined, and switching back and forth between the relevant control patterns must be carried out in the manner described above. Once the value drops below an angle of 30° between the rotor field and the stator field, due to a rotation of the rotor, the control pattern must be revised. The control pattern may be revised arbitrarily, depending on the rotational speed reached.

Control patterns which generate only one phase current, i.e., corresponding to the 120° block commutation in 3-phase machines, are illustrated for a 5-phase machine in the right-hand representation in FIG. 3. It is apparent that one output stage may be influenced in each case by moving the control pattern described in FIG. 3 in the clockwise direction. Accordingly, the same procedure as for 3-phase machines may be used for 5-phase machines. In 5-phase machines, there is the additional advantage that voltage is applied to only one phase during startup, and thus the maximum resistance is present. During the later progression, the overall resistance may be reduced as the voltage rises by adding a more variable number of phases, thereby increasing the total current in the machine.

According to one preferred specific embodiment of the present invention, the alternating control of the low side switches is carried out with a switching duration which is shorter than the time constant of the stator winding, which lies in the range of a few milliseconds. On the one hand, this causes the resulting currents and thus also the generated torque to have a minimal ripple. On the other hand, the switching frequency is sufficiently low so that a DC-link capacitor is not needed.

According to another preferred specific embodiment, an asymmetrical activation ratio between the two low side switches may be selected. This has the advantage that the ideal magnetic vector offset of 90° between the stator and rotor magnetic fields may still be revised to some extent.

A method according to the present invention is described above by way of example for switching vectors "10 -" and "1 - 0" or "- 01" and "0 - 1". The selection of these vectors depends on the idle position of the machine rotor. Other switching vectors may be used in other idle positions of the rotor.

In the method described above, the high side switch assigned to one current phase was held in the closed state, and the low side switches assigned to the other current phases were controlled alternately for the purpose of reducing the starting current. Alternatively, in another idle position of the rotor, the low side switch assigned to one current phase may be held in the closed state, and the high side switches assigned to the other current phases may be controlled alternately for the purpose of reducing the starting current.

Furthermore, switching vectors of the 180° block commutation, or a combination of the two, may be used, for example, by moving back and forth between "10 -" and "100."

Another specific embodiment involves switching between more than two states. This is advantageous, in particular, in machines having more than three phases.

In the method according to the present invention, not only the starting current but also the starting torque are reduced. A further specific embodiment therefore involves developing the method according to the present invention in such a way that it is activatable and/or deactivatable as a function of the operating state of the motor vehicle in which the machine is situated. In particular, it is possible to avoid using the claimed method in the event of a vehicle cold start in the presence of a low ambient temperature and instead to start the vehicle conventionally. It is furthermore possible, in principle, to activate the method according to the present invention in the event of a warm start.

A method according to the present invention is usable, in particular, when starting multi-phase machines operated by block commutation for the purpose of reducing the starting current. The claimed method is suitable mainly for use in conjunction with belt-driven starter generators and integrated starter generators. An advantageous refinement is to control a coasting of the machine in such a way that the machine rotor comes to a stop in an angle position suitable for a restart.

In the discussion above, it is always assumed that the rotor position and the rotor speed are ascertained, and the control of the switches according to the present invention is carried out at a rotor speed which is less than a predefined threshold value. Alternatively, the control of the switches according to the present invention may be activated or deactivated as a function of the measured stator current.

What is claimed is:

1. A method for reducing a starting current of a multi-phase machine operated by block commutation, the multi-phase machine being powered by a battery, the multi-phase machine including a rotor and, for each phase, a high side switch, a low side switch, and a phase winding, the method comprising:
one of: (i) holding the high side switch assigned to one current phase in the closed state, and alternately controlling the low side switches assigned to the remaining current phases; or (ii) holding the low side switch assigned to one current phase in the closed state, and alternately controlling the high side switches assigned to the remaining current phases; and
setting at least one of a control duration and a pause between switching states for whichever of the high side switches and the low side switches is alternately controlled, such that the alternately controlled switches differ with respect to the at least one of a control duration and a pause between switching states.

2. The method as recited in claim 1, further comprising:
ascertaining a speed of the rotor;
wherein the control of the switches is carried out at a rotor speed which is less than a specified threshold value.

3. The method as recited in claim 1, further comprising:
ascertaining a current of a stator of the multi-phase machine;
wherein the method is one of activated or deactivated as a function of the ascertained stator current.

4. The method as recited in claim 1, wherein the control of the switches is revised as a function of the rotor position for the purpose of generating a magnetic rotating field.

5. The method as recited in claim 1, wherein one of (i) a control duration of the alternately controlled low side switches is varied, or (ii) a control duration of the alternately controlled high side switches is varied.

6. The method as recited in claim 5, wherein pauses between consecutive control operations are varied during one of (i) the control of the alternately controlled low side switches or (ii) the control of the alternately controlled high side switches.

7. The method as recited in claim 5, wherein the alternating control is carried out using a switching duration which is shorter than the time constant of a stator winding.

8. The method as recited in claim 5, wherein the method is one of activated or deactivated as a function of an operating state of a motor vehicle in which the multi-phase machine is situated.

9. The method as recited in claim 8, wherein the method is deactivated in the event the motor vehicle is started at a low temperature.

10. The method as recited in claim 8, wherein the method is activated in the event of a warm start of the vehicle.

11. The method as recited in claim 5, wherein the multi-machine is a belt-driven starter generator, and a coasting of the multi-phase machine is controlled to achieve a stop of the rotor at an angle position suitable for restarting the multi-phase machine.

* * * * *